No. 845,572. PATENTED FEB. 26, 1907.
S. PECK.
MEASURING DEVICE.
APPLICATION FILED MAY 31, 1906.
2 SHEETS—SHEET 2.
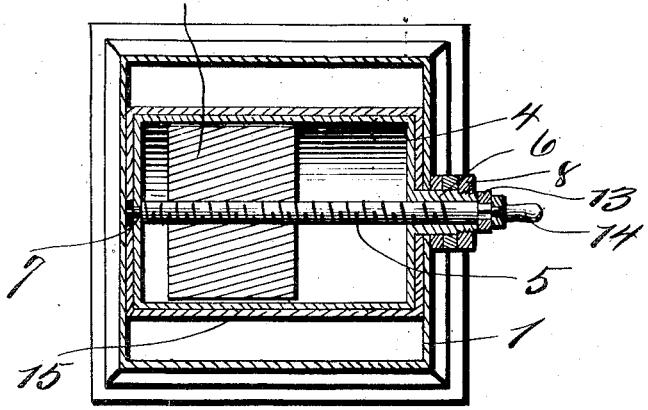
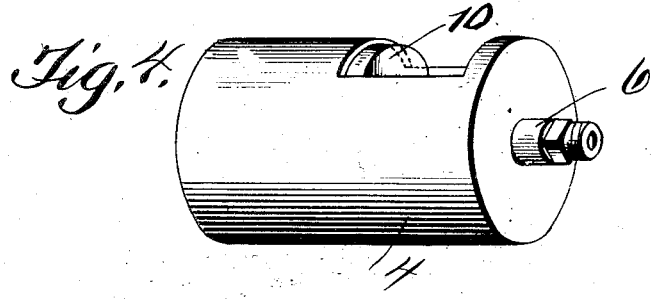
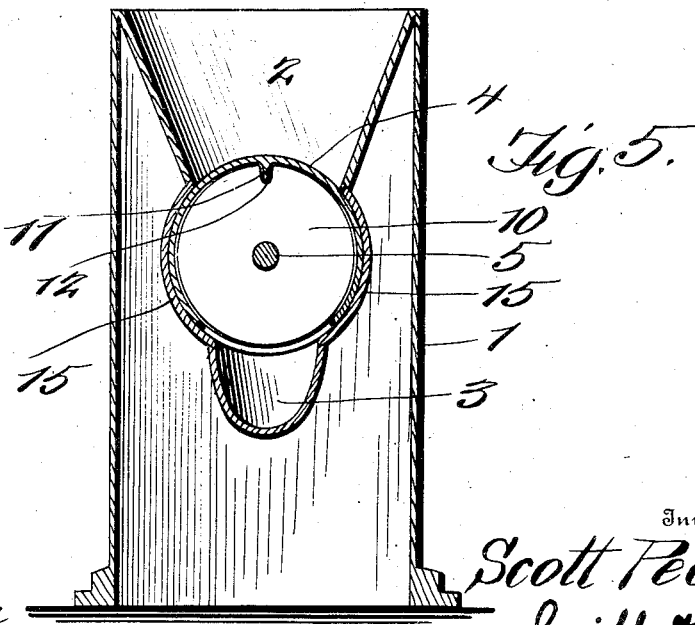
Witnesses
R. W. Boswell
M. O. Bowling
Inventor
Scott Peck,
Swift & C.
Attorneys

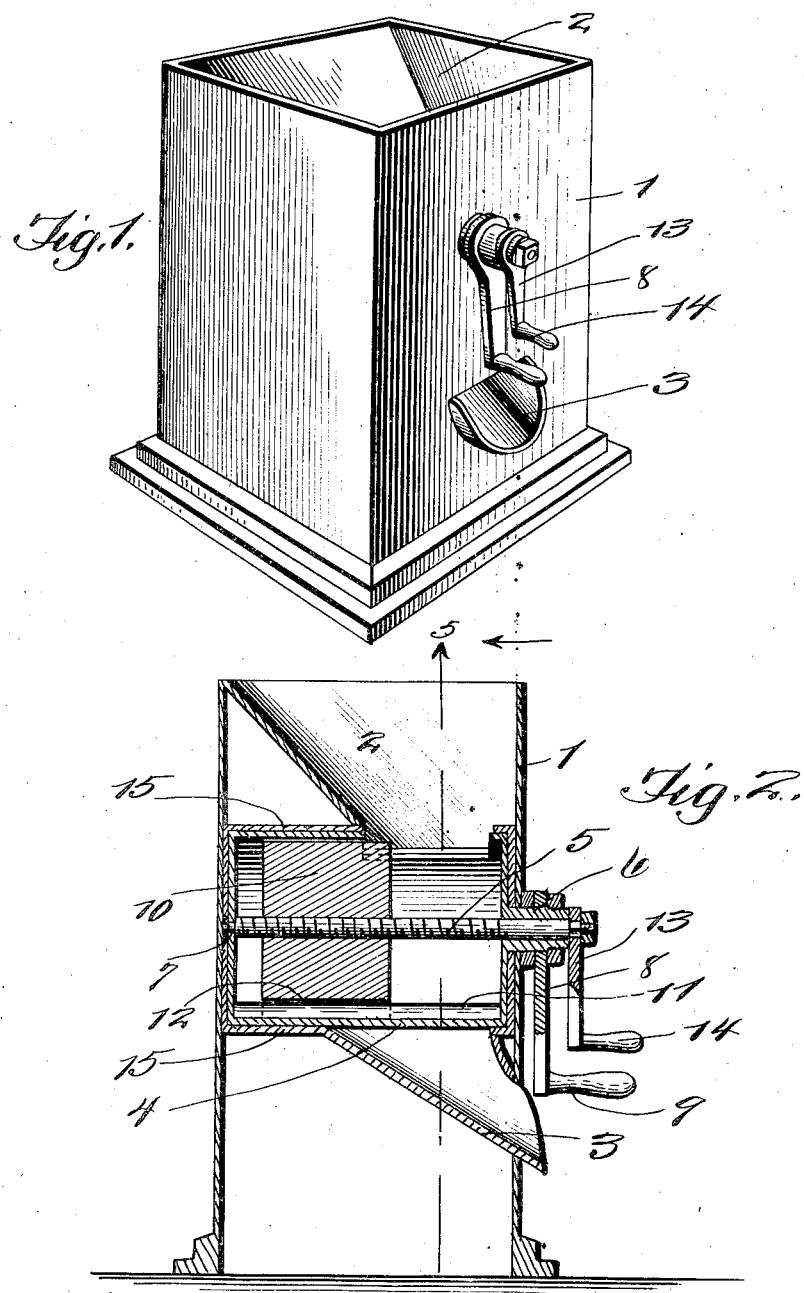

UNITED STATES PATENT OFFICE.

SCOTT PECK, OF MODESTO, CALIFORNIA.

MEASURING DEVICE.

No. 845,572.  Specification of Letters Patent.  Patented Feb. 26, 1907.

Application filed May 31, 1906. Serial No. 319,537.

*To all whom it may concern:*

Be it known that I, SCOTT PECK, a citizen of the United States, residing at Modesto, in the county of Stanislaus and State of California, have invented a new and useful Measuring Device; and I do hereby declare the following to be a full, clear, and exact description of the invention, such as will enable others skilled in the art to which it appertains to make and use the same.

This invention relates to certain new and useful improvements in measuring devices whereby produce consisting of particles of grain or any other granulated form of product may be measured in any requisite quantity by means of a rotatable cylinder and a horizontal movable head, which head is reciprocated by means of worm-screw and is also guided in its reciprocations by means of an integral rib of the rotatable cylinder, the device having a hopper and a chute, as shown clearly in the drawings.

This invention comprises further objects and combinations of elements, which will be hereinafter more fully described, shown in the accompanying drawings, and the novel features thereof will be pointed out by the appended claim.

To obtain a full and correct understanding of the details of construction, combinations of features, elements, and advantages, reference is to be had to the hereinafter set forth description and the accompanying drawings in connection therewith, wherein—

Figure 1 is a perspective view of the measuring device shown in accordance with the invention. Fig. 2 is a vertical section through the device. Fig. 3 is a horizontal cross-section. Fig. 4 is a detail of the rotatable cylinder and the horizontal movable head. Fig. 5 is a vertical section on line 5 5 of Fig. 2.

Referring to the drawings, 1 designates the casing of the device, having a hopper 2 in the upper portion thereof, an inclined chute 3, located in the lower portion of the casing, as shown, and a rotatable cylinder 4, positioned between the two, as illustrated, for the purpose of receiving that which is to be measured. This cylinder is housed in a suitable casing 15, and one end of said cylinder is provided with an apertured boss 6, which forms a bearing for one end of a worm-screw 5, while the other end thereof is received by an aperture 7 in the rear wall of the cylinder. The boss has a bearing in the wall of the casing 1, as shown, and is connected with a laterally-projecting arm 8 and an operating-handle 9 for the purpose of rotating the said cylinder to dump the measured quantity.

To gage that which is to be measured, a movable head 10 is provided, which is mounted within the cylinder and is reciprocated by means of the worm-screw 5 and guided in its horizontal movement by means of a rib 11, integral with the bottom of the cylinder, which rib 11 is received by the horizontally-disposed recess 12 of the movable head 10, as shown clearly in Fig. 5 of the drawings.

To operate the worm-screw so as to move the head 10, one end thereof is provided with a laterally-projecting arm 13, having an operating-handle 14, which arm 13 is short in length, so as to pass freely the operating-handle 9, as will be readily understood from the drawings.

Having thus described the invention, what is claimed as new and useful by the protection of Letters Patent is—

In a measuring device, a casing having a hopper and chute therefor, a rotatable cylinder having a bearing and an apertured boss journaled between the hopper and the chute, a worm-screw the ends of which are journaled in the bearing and the apertured boss, a head movable by the worm-screw, an arm and an operating-handle for rotating the screw and an arm having an operating-handle carried by the boss for rotating the cylinder.

In testimony whereof I have signed my name to this specification in the presence of two subscribing witnesses.

SCOTT PECK.

Witnesses:
 JACOB S. WAGENER,
 ADA S. JACKSON.